United States Patent Office 3,057,872
Patented Oct. 9, 1962

3,057,872
STABLE COPPER PHTHALOCYANINE PIGMENT COMPOSITIONS
William A. West, Westfield, N.J., assignor to E. I. du Pont de Nemours and Company, Wilmington, Del., a corporation of Delaware
No Drawing. Filed June 11, 1959, Ser. No. 819,535
10 Claims. (Cl. 260—314.5)

This invention relates to copper phthalocyanines of the following formula:

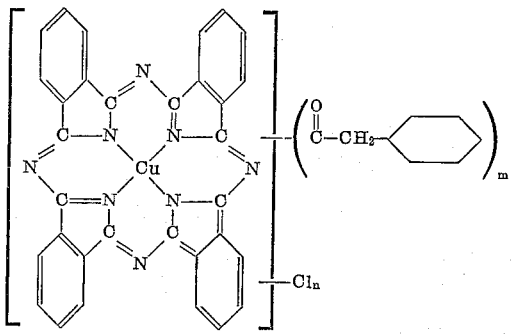

wherein the phenylacetyl groups

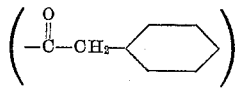

and the Cl atoms are substituted for hydrogen on the benzene rings of the molecule, $m$ averages about 1, and $n$ is a number including 0 and ranging up to 1. For purposes of convenience, the phthalocyanine nucleus, as shown above, will be referred to as Pcy.

Phthalocyanine pigments, and copper phthalocyanine in particular, are well known products which are described in many patents and other publications. There are two widely used methods of preparation. In the one method, a phthalic acid derivative, such as phthalic anhydride, is reacted with urea and a metal salt, such as copper chloride, usually in the presence of an inert diluent liquid at temperatures in the range of about 190° C.–220° C. In the other method, an aromatic dinitrile, such as phthalonitrile, is reacted with a metal salt, such as a copper chloride, at a temperature in the range of 180° C.–300° C. As in the first process, it is common to carry out this reaction in the presence of an inert diluent liquid although both processes may be carried out in the absence of diluent liquid. The diluent liquid may be removed by simple filtration, by steam distillation, or by simple decantation after the pigment has been treated to provote settling. This is usually followed by a conventional drying step.

After drying, pigments obtained by either of these processes are usually subjected to some form of particle size reduction to develop their full pigmentary properties. Various methods of achieving this end have been proposed and widely used. The oldest method is essentially a chemical process in that the pigment is reacted with concentrated sulfuric acid to form a sulfate which is then dissolved in additional concentrated sulfuric acid and re-precipitated by drowning the solution in a large volume of water. A modification of this process uses acid of lower concentration and is commonly known as "acid-swelling." In contrast to these essentially chemical methods of particle size reduction, there have been proposed a number of methods which are essentially mechanical in character in that the particle size reduction is brought about by various types of milling operations. The pigment may be charged to a ball mill together with a relatively large amount of a crystalline material, such as common salt, and after a suitable milling period with relatively large steel balls or similar milling aids, the pigment is isolated by extraction of the water-soluble salt and then purified, usually with dilute acid solution. In another process of like character, the pigment is milled in a ball mill in an organic liquid, such as acetone, preferably using small (±⅛″ diameter) steel shot as the grinding aid. The acetone is removed by steam distillation and a similar purification by extraction with dilute acid is usually used.

A problem concerning the use of phthalocyanine pigments that has been widely recognized and that has received much attention in the published art is that of "crystal stability." Some phthalocyanine pigments have been found to grow relatively large crystals when exposed to certain organic solvents, such as aromatic hydrocarbons, which are often used in connection with the formulation of coating compositions. This crystal growth reverses the effect of the particle size reduction and results in a marked loss in the tinctorial powers of the pigment. It has also been found that phthalocyanine pigments are not only subject to crystal growth but that they are capable of existing in two crystal phases. One phase which has been arbitrarily designated the alpha phase in much published literature (see FIAT Report 1313, vol. 3, p. 447; also U.S. Patent 2,556,726) is relatively red in hue and quite prone to change to the beta crystal phase which is much greener in hue. In order to obtain the redder shade (the alpha phase) of pigment in a crystal-stable form, it has been common practice to incorporate a stabilizing agent with the alpha phase pigment. The effectiveness of such stabilizing agents is usually determined by boiling a sample of the stabilized pigment in an aromatic liquid, such as benzene, toluene, or xylene for a fixed period of time, and then the percent of pigment converted to the beta phase is determined and compared with a control sample similarly treated.

The principal object of this invention is the preparation of crystal-stable phthalocyanine pigments which exhibit the red shade and high intensity of the alpha phase copper phthalocyanine. Another object is the preparation of a phthalocyanine derivative which is capable of imparting the desired crystal stability to otherwise unstable phthalocyanine pigments when properly incorporated therein in relatively small amounts.

When a phthalonitrile synthesis for copper phthalocyanine is carried out in the presence of a substantial amount of phenylacetonitrile and also a substantial amount of a nitrogen base such as pyridine, the product isolated from this synthesis is a phthalocyanine derivative which may be added to a typical unstable copper phthalocyanine under proper conditions to give a product which exhibits the red shade and high intensity of an alpha phase copper phthalocyanine and which is substantially free from any tendency to change phase or to crystallize in the presence of aromatic solvents. It is also possible, as will be pointed out hereinafter, to isolate from this derivative a relatively pure compound which may be used in a very much smaller amount to impart the same properties to a copper phthalocyanine pigment.

In a typical preparation of the preferred derivative, one mol of phthalonitrile is reacted with approximately one-half mol of anhydrous cupric chloride and one-third mol of phenylacetonitrile in the presence of approximately one mol of pyridine. The best results require that the reaction be carried on at a temperature of about 200° C. and for a substantial period of time in the order of one hour or more, and it may be done either in a fusion mixture without the addition of any other agent or in suspension in an inert solvent, such as ethylene glycol or trichlorbenzene. This reaction differs from the conventional phthalocyanine synthesis in the addition of the phenylacetonitrile and in the relatively large amount of pyridine present. Following the completion of the reaction, when carried out in the fusion type of reaction, the material is cooled and pulverized and then extracted in a weak acid solution such as 5% sulfuric acid heated to the boil, then filtered hot, washed free of soluble salts, and dried to give a blue solid which may then be incorporated in amounts in the order of 3% to 10% with an untreated copper phthalocyanine in the red shade alpha phase modification. The preferred method of incorporation involves acid swelling of the previously dry-milled copper phthalocyanine together with the appropriate amount of the new derivative. In this operation, the mixed pigments are added to a sulfuric acid solution of approximately 70% concentration, allowed to stand for some time after thoroughly mixing, and then hydrolyzed by adding to a relatively large amount of hot water. The final isolation of the pigment by filtration, washing, and drying is entirely conventional.

It will also be shown in the examples below that an alternative method of operation involves the extraction from the originally prepared synthesis mass of a relatively pure phthalocyanine derivative by repeated treatment with a hot solvent such as orthodichlorbenzene, followed by removal of the solvent by heat and vacuum to give a product which is several times more effective in promoting the crystal stability. Thus, this purer derivative may be used in such small amounts as 0.5%–2% to impart the desired crystal stability to unsubstituted alpha phase copper phthalocyanine.

The methods of operation and the nature of the products obtained will be set forth in more detail in the examples which follow. Unless otherwise stated, reference is made to parts by weight throughout.

EXAMPLE I 128 parts (1 mol) of phthalonitrile is intimately mixed with 77 parts (0.57 mol) of anhydrous cupric chloride, 38 parts (0.33 mol) of phenylacetonitrile, and 77 parts (1 mol) of pyridine. The mixture is heated slowly (30 min. to 1 hour) to about 200° C. and the temperature is maintained between about 200° C. and 240° C. for about one hour. The mixture fuses at 140° C.–160° C. with a somewhat exothermic reaction to give a solid product on further heating which, after cooling, is pulverized. The powder is dispersed in about 1900 parts of 5% aqueous sulfuric acid and the slurry is heated to the boil, boiled 15–30 min., filtered hot, washed free of soluble salts, and dried to give about 130 parts of a blue solid which is an effective agent for promoting crystal stability in the alpha phase of copper phthalocyanine, which is otherwise unstable, when incorporated therein by suitable means and in suitable amounts as set forth hereinafter.

The product of this example is a cosynthesized mixture comprising unsubstituted copper phthalocyanine and substituted copper phthalocyanine containing at least one

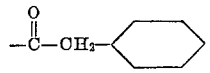

group, and in addition the product may contain small amounts of chlorine since, as is well known, chlorine finds its way into the phthalocyanine molecule when a phthalonitrile synthesis is used. However, it is also well known that the amount of chlorine is reduced in the presence of pyridine or other nitrogen bases, approaching negligible amounts as the amount of pyridine becomes large. It is also to be understood that it is possible to have an average of less than 1 chlorine atom per molecule or more than 1 phenylacetyl radical per molecule because of the presence of some unsubstituted material and the statistical probability of some multiple substitution. The term "at least one" is means to include such mixtures.

EXAMPLE II

A product essentially equivalent to that of Example I is made when the ratio of ingredients is as follows:

Phthalonitrile _____ 128 parts (1 mol).
Anhydrous cupric chloride____ 51 parts (range 0.4 mol to 0.7 mol).
Phenylacetonitrile _____ 25.6 parts (range 0.2 mol to 0.5 mol).
Pyridine or other tertiary nitrogen base _____ 25.6 parts (range 0.3 mol to 1.0 mol).

EXAMPLE III

Using a suitable reaction vessel equipped with an efficient agitator and a reflux condenser and arranged for external heating, 445 parts of ethylene glycol is charged to the vessel followed by 128 parts (1 mol) of phthalonitrile, 50 parts (0.43 mol) of phenylacetonitrile, 0.6 part of ammonium molybdate, 80 parts (0.6 mol) of anhydrous cupric chloride, and 39 parts (0.5 mol) of pyridine. The charge is heated with good agitation to 195° C. in about one hour and maintained at 195° C.–200° C. for about three hours. After cooling below 100° C., the charge is drowned into about 5000 parts of cold water, filtered, and the paste reslurried in about 2000 parts of 5% aqueous sulfuric acid. The slurry is heated to the boil, boiled for a short time, filtered, washed free of soluble salts, and dried to give 125 parts of a brownish-green solid, which, except for its superficial color, has the same properties as the blue powder of Example I.

The ethylene glycol in this example can be replaced by a water-immiscible solvent such as trichlorobenzene or purified kerosene, in which case the major portion of the organic liquid is preferably removed from the reaction mixture by steam distillation followed by the acid extraction and isolation as shown above.

EXAMPLE IV

A substantially chlorine-free copper phthalocyanine which requires stabilization to be suitable for use as a red shade alpha phase copper phthalocyanine, may be prepared in a number of ways which are immaterial to this invention. One convenient route to such a product is by the reaction at a temperature of about 200° C. of a mixture of phthalic anhydride, urea, and a copper chloride in the presence of a catalyst such as ammonium molybdate while suspended in a high-boiling inert liquid such as trichlorobenzene or kerosene. The product is conveniently isolated from the reaction mass by the addition of 98% sulfuric acid to form the sulfate followed by decantation of the liquid and subsequent hydrolysis by drowning in water, filtering, washing and drying until both water and organic liquid are removed.

Regardless of the method of synthesis and isolation, a particle size reduction step is required as well as a step which will insure that the pigment is principally in the form of the red shade alpha phase.

One convenient method of particle size reduction is by a combination of dry milling in a ball mill followed by acid swelling. The dry milling is conveniently done by charging the pigment to a ball mill containing relatively large grinding aids such as "Cyl-Pebs" (steel rods about 1″ x ½″) and milling for about 6 hours.

95 parts of such a dry-milled copper phthalocyanine and 5 parts of the product of Example I are dusted into 456 parts of 70% sulfuric acid with stirring until all of the powder is wet. The mixture is then allowed to stand for one hour, diluted with 2700 parts of water, and boiled for one hour. The pigment is isolated by filtration, washing free of soluble salts and drying to give about 100 parts of an alpha phase, red shade copper phthalocyanine of outstanding resistance to crystal growth and phase change in organic solvents.

The concentration of sulfuric acid can be varied between about 68% and 80% with substantially equivalent results.

EXAMPLE V

A product substantially equivalent to that of Example IV can be obtained if the two ingredients are separately acid swelled and intimately mixed in the form of their hydrolyzed slurries prior to filtration. Thus, the process of Example IV is repeated through the milling, acid swelling and hydrolysis stages but without adding any of the product of Example I during the acid swelling.

In a separate operation 5 parts of the product of Example I is dusted into about 25 parts of 70% sulfuric acid, stirred until thoroughly wet, and allowed to stand for about one hour. It is then diluted with 150 parts of water and the resultant slurry added to that obtained in the first part of this example. After a period of vigorous agitation, the composite pigment is isolated in the conventional manner to give about 100 parts of an alpha phase copper phthalocyanine comparable to that of Example IV.

EXAMPLE VI 95 parts of a crude chlorine-free copper phthalocyanine and 5 parts of the product of Example I are dusted into 1300 parts of 98% sulfuric acid at a temperature of 20° C.–30° C. and stirred until complete solution is obtained. This solution is added dropwise to 12000 parts of boiling water, the suspension filtered and washed acid-free to give an alpha phase copper phthalocyanine which is highly resistant to phase change when heated in organic solvents.

EXAMPLE VII

A mixture of 1150 parts purified kerosene
148 parts phthalic anhydride (1 mol)
231 parts urea
0.65 part ammonium molybdate
36 parts cupric chloride (anhydrous)
6.8 parts product of Example I.

is charged to a suitable reactor equipped with agitation, a reflux condenser and a heating jacket. The charge is heated with good agitation to about 190° C. over a period of about two hours and held between about 187° C. and 193° C. for about three hours. After cooling below 100° C., the reaction mixture is added to 3250 parts of water containing 32 parts of sodium hydroxide, boiled two hours, filtered hot, washed alkali-free, and dried at 150° C. under vacuum until substantially free of kerosene. The product of this example is substantially all in the alpha crystal phase and may be converted to a pigmentary particle size by any of the well known methods to give a red-shade alpha phase copper phthalocyanine of excellent crystal stability. The preferred method of particle size reduction is the combination of dry milling and acid swelling outlined in Example IV, but it may also be done by acid pasting or by milling with a solvent such as acetone.

EXAMPLE VIII

*Preparation of*

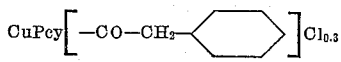

The product of Example I, although an excellent crystal-stabilizing agent for alpha phase copper phthalocyanine, is a mixture containing insoluble material. It is possible, however, to extract, by means of appropriate solvents, from the product of Example I the stabilizing agent

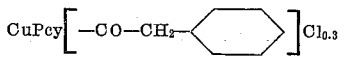

which can be used with unsubstituted alpha phase copper phthalocyanine in lesser amounts than the product of Example I. This present example illustrates such a solvent extraction.

100 parts of the product of Example I is slurried in about 500 parts of o-dichlorobenzene, heated to about 150° C., and stirred for about 30 minutes. A substantial blue color in the solution indicates that a soluble component is being extracted. The suspension is filtered hot and the paste is reslurried in additional hot o-dichlorobenzene. The extractions after this manner are repeated above five times. The filtrates are combined and evaporated to dryness under heat and vacuum to give about 15 parts of a dark blue solid which is readily soluble in many organic solvents. As shown in Example IX below, it is several times more active in promoting crystal stability than is the synthesis product of Example I.

Analysis of this product for nitrogen, copper and Cl shows

|   | Actual, percent | Theory, percent |
|---|---|---|
| N | 15.66 | 15.88 |
| Cu | 7.36 | 9.0 |
| Cl | 1.51 | 1.51 |

Degradative reactions for purposes of identification have given pyromellitic acid, benzoic acid and phenylacetic acid, thus confirming the presence of the phenylactyl group attached to the phthalocyanine nucleus.

Infra red diffraction shows a band at 5.8 microns indicative of a carbonyl group. The product also shows a characteristic infra red band at 10.1 microns which appears to be unique for this product.

EXAMPLE IX 99 parts of a dry-milled chlorine-free copper phthalocyanine (see Example IV above) and 1 part of the phenylactyl substituted copper phthalocyanine of Example VIII are dusted together into 450 parts of 70% sulfuric acid, stirred briefly, and the mixture allowed to stand for about one hour. It is then diluted with about 3000 parts of water, heated to the boil and boiled for one hour, then filtered, washed and dried to give a red shade alpha phase copper phthalocyanine of excellent crystal stability.

The preparation of alpha crystal phase copper phthalocyanines that are resistant to crystal growth and phase change may be attained by means of two routes. Both routes use the same agent, and they may be summarized as follows:

(1) The agent and the phthalocyanine are independently prepared and then intimately mixed under certain specific conditions as a separate operation.

(2) The agent is incorporated in the synthesis mixture so that it is present during the formation of the phthalocyanine.

The preparation of the agent is shown as a modification of a phthalocyanine synthesis from phthalonitrile differing from the conventional synthesis in (1) the presence of phenylacetonitrile and (2) the presence of a nitrogen base such as pyridine, picoline, quinoline, or isoquinoline. Examples I and II are typical of such preparations and show rather broad ranges in amounts of reactants based on the phthalonitrile used. One outstanding feature is a larger excess of the copper salt, approximately twice that normally used in a typical phthalocyanine synthesis.

The reaction used to prepare the phenylacetyl copper phthalocyanine starts at about 140° C.–160° C. but continued heating up to 200° C. and above is necessary for good yields. Within a temperature range of about 200°

C.–290° C., excellent products are obtained. It appears to require at least about 15 minutes in this temperature range for good yield with longer times up to about one hour preferred to give still better yields. The use of a solvent in such a reaction, as shown in Example III, is similar in all ways except that it tends to be complete at a somewhat lower temperature. In nearly all respects, these conditions are typical of phthalocyanine preparations in general, except for the introduction of new ingredients as mentioned specifically above.

The isolation of the pure product by extraction with a solvent demonstrates the character and composition of the active agent but is not a necessary step in the practice of the invention.

In Example IV the preparation of the unsubstituted phythalocyanine to be stabilized proceeds via the phthalic anhydride-urea route. However, neither the method of preparation nor the composition of the phthalocyanine to be stabilized is critical. The preparation may be done via the phthalonitrile route if desired and other metal phthalocyanines as cobalt or nickel phthalocyanines, as well as the metal-free variety, may be used.

The preferred means of intimate mixing of the new agent of this invention with the prior-art unstable phthalocyanine is to introduce the agent during the usual step of particle size reduction. The acid-swelling method of Example IV wherein the agent is added to sulfuric acid of suitable concentration along with the dry-milled prior art pigment is an excellent method of operation. However, the agent can be added to the dry-milling step or the acid swelling can be done separately and the hydrolyzed slurries mixed prior to filtration as shown in Example V.

Other common methods of particle size reduction such as acid pasting or milling in a suitable liquid such as acetone can also be used if the agent and the prior art pigment are treated together.

The second method of stabilization involves the introduction of the new agent into the synthesis of a phthalocyanine prior to the actual reaction as shown in Example VII. The phthalic anhydride-urea synthesis route is shown but other prior art methods of synthesis may be used such as synthesis from phthalonitrile and a copper salt. The amount of agent (using the product of Example I) should be in the range of about 2.5%–9% by weight of phthalic anhydride used, with about 4.5% preferred. If the purified agent of Example VIII were used, the amount required would be much less in the range of about 0.5% to 1.8%. Amounts of stabilizer in excess of the ranges set forth in this specification may be used; however, dilution by the use of large amounts of the stabilizer would tend to diminish the tinctorial properties of the alpha phase material.

In such a process, the other synthesis conditions are typical of the prior art using an inert diluent liquid such as kerosene, trichlorobenzene, or the like, or omitting the liquid altogether, if desired, the preferred temperature range being about 185° C.–210° C. and the time within this temperature range being from 1 to 4 hours.

The isolation of the pigment is conventional as is the method of particle size reduction, although the degree of stabilization seems to be somewhat influenced by the method of particle size reduction. The combination of dry milling and acid swelling shown in Example IV is definitely preferred, but acid pasting can be used as well as various methods of milling in organic liquids (solvent-milling) such as those shown in U.S. 2,556,727 and U.S. 2,857,400.

Since it is obvious that many changes and modifications can be made in the above-described details without departing from the nature and spirit of the invention, it is to be understood that the invention is not to be limited to said details except as set forth in the appended claims.

I claim:

1. A copper phthalocyanine having the formula:

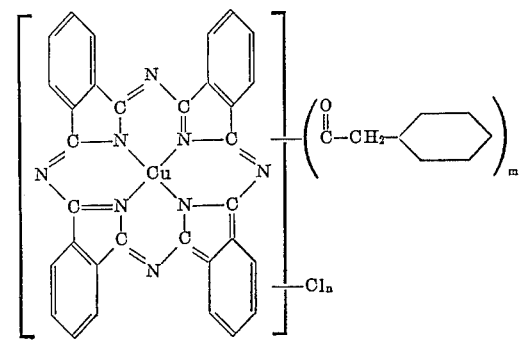

wherein the phenylacetyl groups

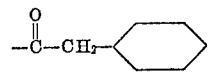

and the Cl atoms are substituted for hydrogen on the benzene rings of the molecule, $m$ averages about 1, and $n$ is a number including 0 and ranging up to 1.

2. An alpha phase copper phthalocyanine pigment resistant to crystal growth and phase change consisting essentially of an intimate mixture of a major amount of alpha phase copper phthalocyanine pigment and the product of claim 1 in pigment particle size in a minor amount sufficient to render said alpha phase pigment resistant to said crystal growth and phase change.

3. An alpha phase copper phthalocyanine pigment resistant to phase change consisting essentially of a co-acid-pasted mixture of a major amount of alpha phase copper phthalocyanine and the product of claim 1 in a minor amount sufficient to render said alpha phase pigment resistant to said phase change.

4. In a process for the production of a copper phthalocyanine by the reaction of phthalonitrile with a copper chloride at elevated temperatures, the improvement which comprises producing a substituted copper phthalocyanine by conducting said reaction with a ratio of 1 mol of phthalonitrile to 0.4–0.7 mol of copper chloride and in the presence of 0.2–0.5 mol of phenylacetonitrile and 0.3–1 mol of a heterocyclic tertiary nitrogen base, and recovering a mixture of unsubstituted copper phthalocyanine and a copper phthalocyanine with an average of about one

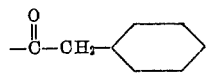

per molecule.

5. The process of claim 4 in which the heterocyclic tertiary nitrogen base is pyridine.

6. A copper phthalocyanine composition consisting essentially of an intimate mixture of a major amount of unsubstituted copper phthalocyanine and a minor amount of a copper phthalocyanine substituted with an average of about one

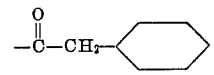

per molecule, said composition being produced by the process of claim 4.

7. A copper phthalocyanine composition consisting essentially of a cosynthesized mixture of a major amount of unsubstituted copper phthalocyanine and a minor amount of a copper phthalocyanine substituted with an average of about one -C(=O)-CH₂-⟨phenyl⟩ per molecule and with an average of 0–1 chlorine substituents per molecule, said product being a crystal-stabilizing agent for unsubstituted alpha phase copper phthalocyanine.

8. An alpha phase copper phthalocyanine pigment resistant to crystal growth and phase change consisting essentially of an intimate mixture of a major amount of alpha phase copper phthalocyanine pigment and the product of claim 7 in pigment particle size in a minor amount sufficient to render said alpha phase pigment resistant to said crystal growth and phase change.

9. An alpha phase copper phthalocyanine pigment resistant to crystal growth and phase change consisting essentially of a co-acid-swelled mixture of a major amount of alpha phase copper phthalocyanine and the product of claim 7 in a minor amount sufficient to render said alpha phase pigment resistant to said crystal growth and phase change.

10. In a process for the production of copper phthalocyanine by reaction of phthalic anhydride with urea and a copper chloride at elevated temperatures, the improvement which comprises conducting said reaction in the presence of the product of claim 7 in an amount of from 2.5% to 9% by weight of the phthalic anhydride.

References Cited in the file of this patent

UNITED STATES PATENTS

| | | |
|---|---|---|
| 2,163,768 | Tanner | June 27, 1939 |
| 2,286,679 | Heilbron et al. | June 16, 1942 |
| 2,291,452 | Dahlen et al. | July 28, 1942 |
| 2,342,662 | Haddock | Feb. 29, 1944 |
| 2,476,952 | Beard | July 26, 1949 |
| 2,556,727 | Lane et al. | June 12, 1951 |
| 2,568,569 | Sullivan | Sept. 18, 1951 |
| 2,713,005 | Baunsgaard et al. | July 12, 1955 |
| 2,799,595 | Kudzin | July 16, 1957 |
| 2,816,114 | Ehrich | Dec. 10, 1957 |
| 2,846,441 | Muehlbauer et al. | Aug. 5, 1958 |
| 2,891,964 | Roberts | June 23, 1959 |